(12) United States Patent
Chen et al.

(10) Patent No.: US 9,251,215 B2
(45) Date of Patent: Feb. 2, 2016

(54) DATA STAGING FOR RESULTS OF ANALYTICS

(75) Inventors: Qiming Chen, Cupertino, CA (US); Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 619 days.

(21) Appl. No.: 13/007,467

(22) Filed: Jan. 14, 2011

(65) Prior Publication Data

US 2012/0185439 A1  Jul. 19, 2012

(51) Int. Cl.
*G06F 17/30* (2006.01)
(52) U.S. Cl.
CPC ............................. *G06F 17/30516* (2013.01)
(58) Field of Classification Search
USPC .................. 707/661, 665, 667, 673, 756, 795; 370/351
See application file for complete search history.

(56) References Cited

U.S. PATENT DOCUMENTS

| 7,210,625 | B2* | 5/2007 | McNutt et al. ................ 235/385 |
| 8,023,934 | B2* | 9/2011 | Jeide et al. .................... 455/418 |
| 2001/0007570 | A1* | 7/2001 | Mangin ......................... 370/537 |
| 2003/0172368 | A1* | 9/2003 | Alumbaugh et al. ......... 717/106 |
| 2005/0066331 | A1* | 3/2005 | Inoue et al. ................... 718/104 |
| 2006/0067296 | A1* | 3/2006 | Bershad et al. ............... 370/351 |
| 2007/0074258 | A1* | 3/2007 | Wood et al. ................... 725/105 |
| 2008/0043587 | A1* | 2/2008 | Gandolph et al. ......... 369/47.15 |
| 2009/0106521 | A1* | 4/2009 | Whisnant et al. ............ 711/170 |
| 2009/0182779 | A1 | 7/2009 | Johnson |
| 2009/0327205 | A1* | 12/2009 | Sweeney ........................ 706/54 |
| 2010/0036831 | A1 | 2/2010 | Vemuri et al. |
| 2010/0169503 | A1* | 7/2010 | Kollmansberger et al. ... 709/231 |
| 2010/0186020 | A1 | 7/2010 | Maddhirala et al. |
| 2011/0130119 | A1* | 6/2011 | Gupta et al. .................. 455/411 |
| 2011/0179066 | A1* | 7/2011 | Cardno et al. ................ 707/769 |
| 2011/0191344 | A1* | 8/2011 | Jin et al. ....................... 707/739 |
| 2012/0030188 | A1* | 2/2012 | Gutlapalli et al. ............ 707/711 |
| 2012/0158991 | A1* | 6/2012 | Ajjaguttu et al. ............. 709/238 |

FOREIGN PATENT DOCUMENTS

WO    WO-2008098106 A2    8/2008

OTHER PUBLICATIONS

Arasu, et al., "The CQL Continuous Query Language: Semantic Foundations and Query Execution" VLDB Journal, (15)2, Jun. 2006.
Chandrasekaran, et al., TelegraphCQ: Continuous Dataflow Processing for an Uncertain World. CIDR 2003.
Chen, et al., "Experience in Extending Query Engine for Continuous Analytics", Proc. Dawak'10, 2010.

(Continued)

*Primary Examiner* — Boris Gorney
*Assistant Examiner* — Bao Tran
(74) *Attorney, Agent, or Firm* — Hewlett Packard Enterprise Development

(57) ABSTRACT

Data staging for results of analytics according to an example method includes maintaining current results from the analytics in a first data structure, the first data structure having a label identifying first data structure as a target for queries. The method also includes maintaining prior results from the analytics in at least one other data structure. The method also includes changing the label of the first data structure after a predetermined time. The method also includes assigning the label to one of the other data structures, wherein the label identifies the one of the other data structures as the target for queries.

13 Claims, 4 Drawing Sheets

(56) References Cited

OTHER PUBLICATIONS

Franklin, et al., "Continuous Analytics: Rethinking Query Processing in a Network-Effect World", CIDR 2009.

Gedik, et al., "SPADE: The Systems S Declarative Stream Processing Engine", ACM SIGMOD 2008.

Liarou et.al.,"Exploiting the Power of Relational Databases for Efficient Stream Processing", EDBT 2009.

SageLogix, Inc. "Scale to Infinity", http://www.sagelogix.com/idc/groups/public /documents/sagelogix-whitepaper/sage016100.pdf.

Jesus Mena; "Homeland Security Techniques and Technologies" http://books.google.co.in/books?id=poZl1xnOfhcC&pg=PA293&dq=%22continuous+query.

\* cited by examiner

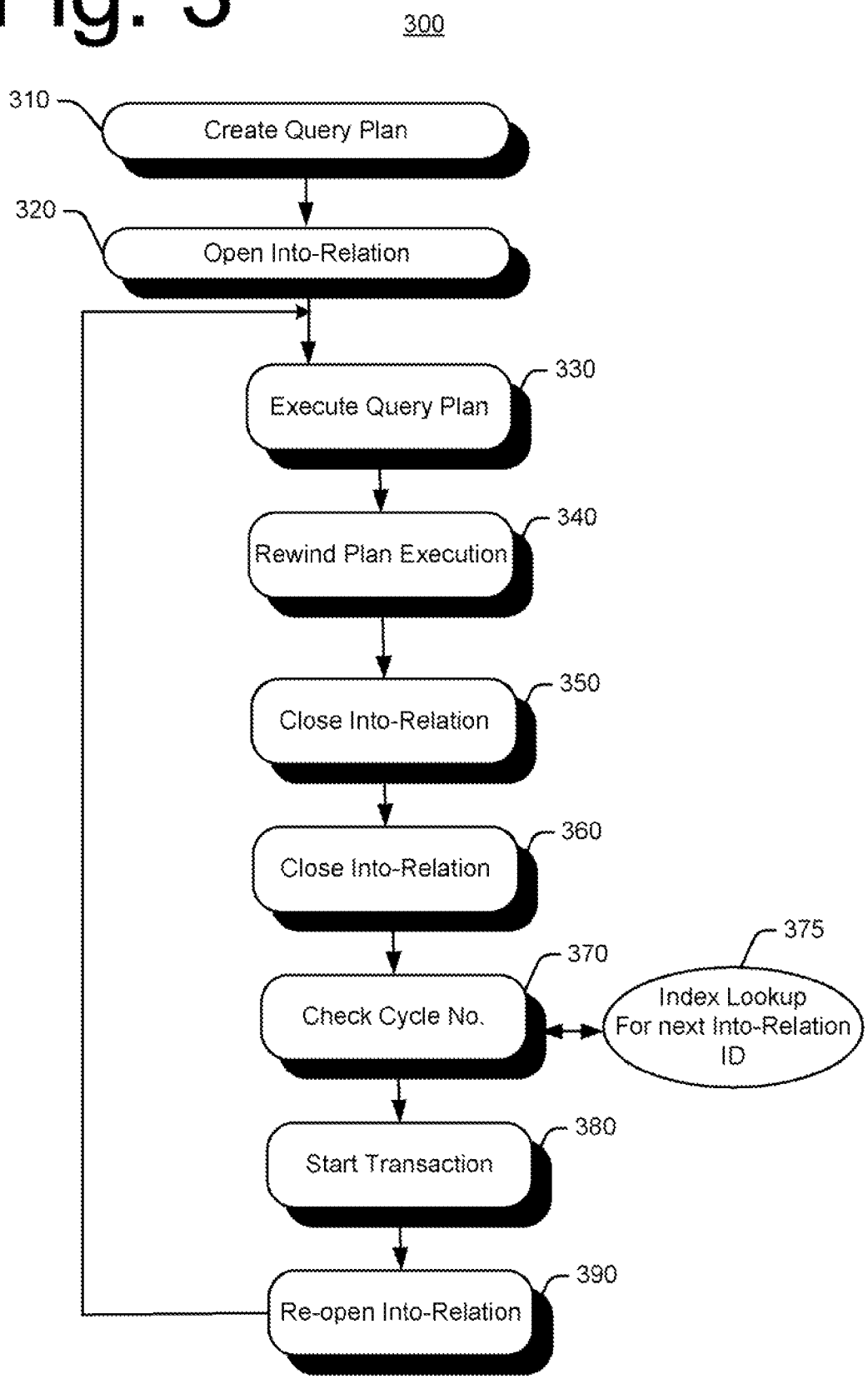

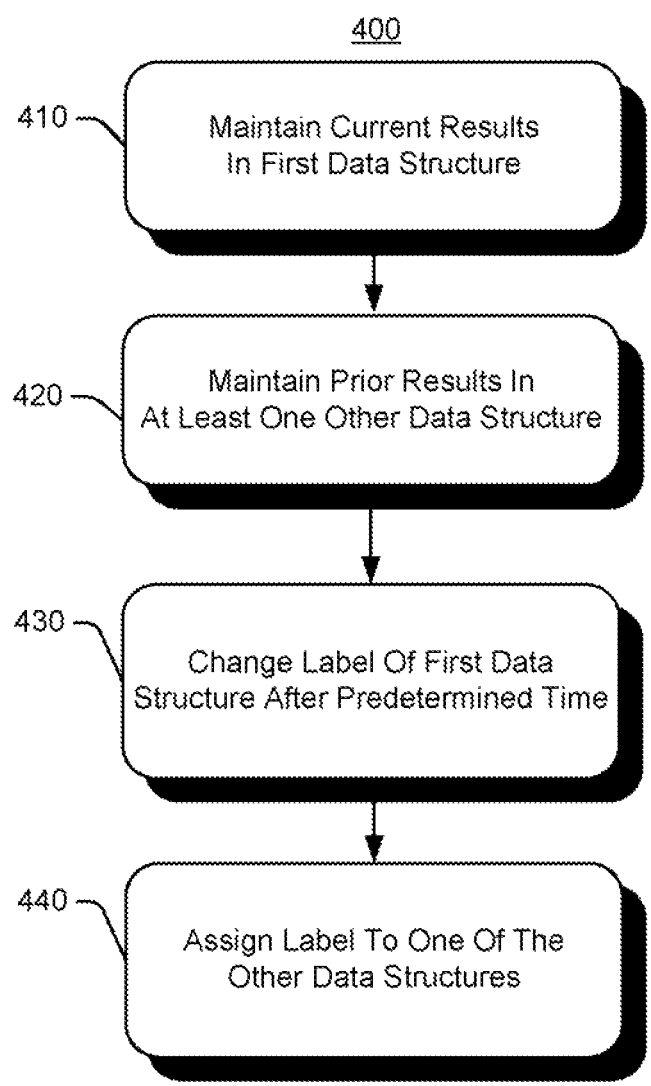

DATA STAGING FOR RESULTS OF ANALYTICS

BACKGROUND

Mobile devices, including for example mobile phones (so-called "smart" phones), global positioning system (GPS) devices, and even laptop/netbook computers, provide diverse remote data capabilities. Many mobile applications are based on so-called "cloud" services, such as location services, messaging services, and so forth. Currently most cloud services are based on statically prepared information, and do not offer real-time analytics of dynamically captured events. For example, a weather report or traffic report may be updated periodically to a local news website.

Users of mobile devices, however, are coming to expect more frequent updates of events, often in real-time. For example, users may not just want a statically prepared traffic report (e.g., delays on the interstate due to an earlier accident). In addition, more real-time information is becoming readily available (e.g., concerning the location, speed, and accident involvement of many individual cars). Of course, to most users the interesting and more useful information is not the individual data (such as each car's position and speed), but information that has been analyzed and summarized for the user in real-time (e.g., the average or moving average speed of a lane of traffic on the interstate). This information can be derived from the individual data using various analytics.

The information is typically analyzed using a continuously running query. The continuous query executes cycle-by-cycle to process the data stream on a chunk-by-chunk basis. The query commits results to the data structure on a cycle-by-cycle basis to make the chunk-wise results visible to users. But in the case that the information is derived from a large (or "infinite") number of events, the information is also infinite. Accordingly, the data structure storing the information continues to grow and can quickly become too big to handle by most mobile devices.

Mobile devices, such as those running WebOS and HTML 5, may download data in batch to ease the bandwidth limitations. However, conventional batching involves data copying and moving, which still incurs performance overhead and, in the case of very large data structures, may still cause service interruptions.

Archiving has also been used for data warehouse management applications. In these archiving techniques, the latest data is maintained in the table and older data is archived from time to time. But archiving the older data also involves moving and copying the data from the table. For example, the data may be moved from a first table holding the latest data, to another table, so that the first table only holds the new data. While this approach has been used for handling slowly-updated data in data warehousing applications, archiving is not efficient for supporting real-time analytics.

BRIEF DESCRIPTION OF THE DRAWINGS

FIG. 3 illustrates example operations which may be used by the query engine for continuous staging.

FIG. 4 is a flowchart illustrating example operations which may be implemented for data staging for analytics.

DETAILED DESCRIPTION

The overhead associated with data move and/or copy operations in conventional systems can be debilitating. In addition, the service is often interrupted during the archiving process because the table being queried is also the same table that is being archived. Systems and methods are disclosed herein of data staging for results of analytics, such as continuous stream analytics (CSA). The results may be staged efficiently through metadata manipulation, without actually moving and/or copying data, and without shutting down the continued query that generates the results on a continuous (or substantially continuous) basis.

In an embodiment, table-ring based data staging utilizes small-size data structures that help to ensure low-latency data retrieval. Maintaining the results of analytics in small sized tables makes the results more easily accessible by mobile applications operating in reduced bandwidth environments, such as those running on WebOS with HTML 5 caching capability.

In addition, the results are staged by "switching labels" of the data structures. This approach helps to ensure the stability of server interfaces and client interfaces (e.g., application programming interfaces or APIs). That is, the target label or metatag specified by database queries remains the same regardless of which table the label has been assigned to.

Figure 1:
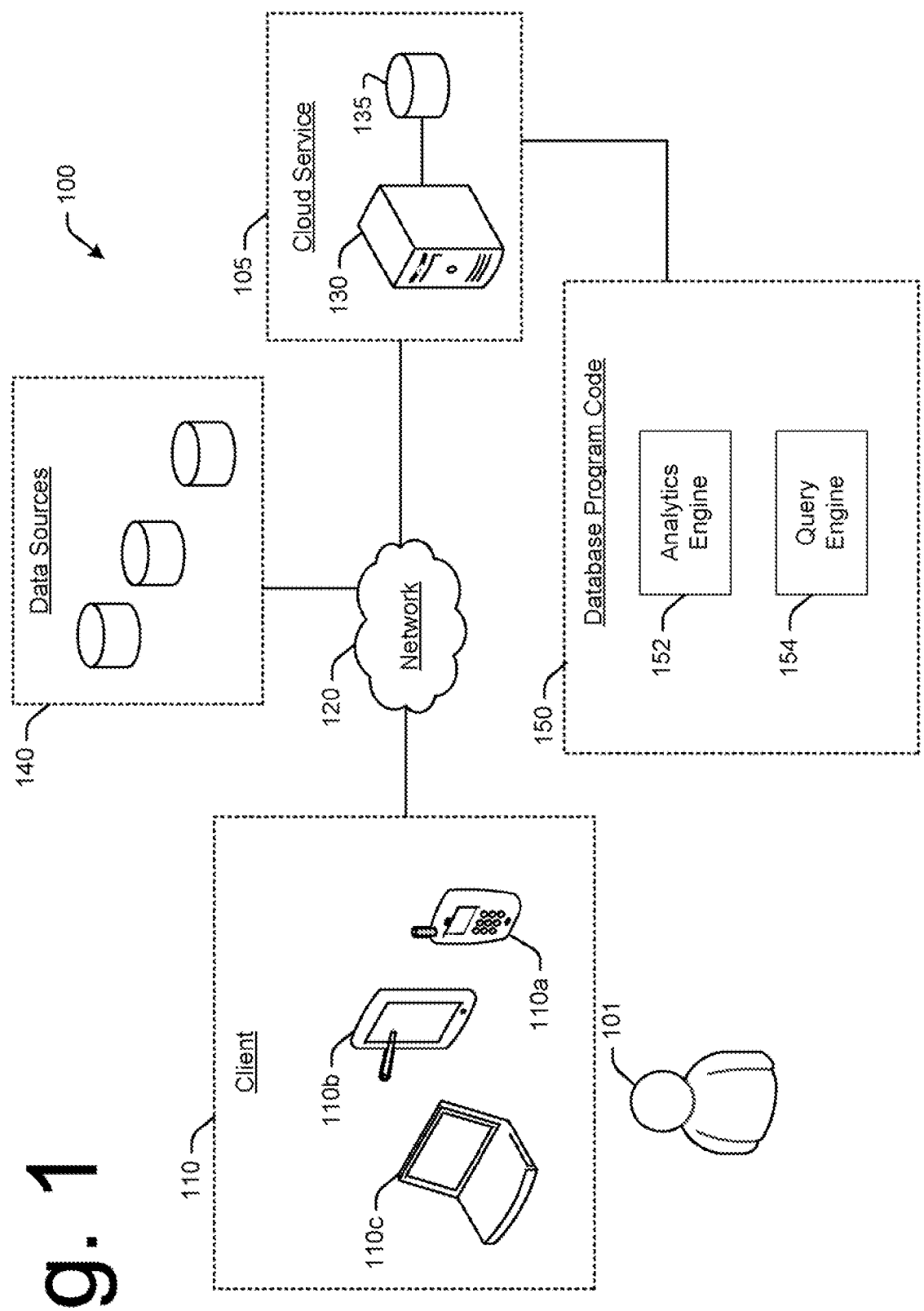
FIG. 1 is a high-level illustration of an exemplary networked computer system which may implement data staging for analytics.

FIG. 1 is a high-level illustration of an exemplary networked computer system 100 which may implement data staging for analytics. The networked computer system may include a cloud service 105 accessed by a user 101 on a client device 110, such as a mobile device. For purposes of illustration, the cloud service 105 may be a data processing service, such as a real-time traffic service. Client 110 may be a mobile phone 110a (e.g., a smart phone), a tablet 110b, or a laptop/netbook computer 110c. In other embodiments, however, the client 110 may refer to any computing device. Although described herein with reference to a mobile device, the client 110 is not limited to use with any particular type of device.

The networked computer system 100 may include one or more communication networks 120, such as a local area network (LAN) and/or wide area network (WAN). In one example, the networks 120 include the Internet or other mobile communications network (e.g., a 3G or 4G mobile device network).

A host 130 may be implemented with (or as part of) the cloud service 105 in the networked computer system 100. As an example, host 130 may include one or more computing systems, such as a personal computer or server computer, and may include at least some degree of processing capability and computer-readable storage. The host 130 is also connected to, or able to establish a connection with, the client 110. By way of example, the host 130 may be a server computer or a plurality of server computers.

The host 130 may be provided on the network 120 via a communication connection, such as via an Internet service provider (ISP). In this regard, host 130 may be accessed by the client 110 directly via the network 120, or via an agent, such as a network site. In an embodiment, the agent may include a web portal on a third-party venue (e.g., a commercial Internet site), which facilitates a connection for one or more clients with host 130. In another embodiment, portal icons may be provided (e.g., on third-party venues, pre-installed on a computer or mobile device, etc.) to facilitate a communications connection between the client 110 and the host 130.

Before continuing, it is noted that the systems and methods described herein may be implemented with any of a wide variety of computing devices, such as, but not limited to, stand-alone personal desktop computers, workstations, personal digital assistants (PDAs), and appliances (e.g., devices dedicated to providing a service), to name only a few examples. Each of the computing devices may include memory, storage, and a degree of data processing capability at least sufficient to manage a communications connection either directly with one another or indirectly (e.g., via a network).

The host 130 may be implemented to receive data from at least one source 140. The source 140 may be part of the cloud service 105. Or the source 140 may be distributed in the network 120. For example, the sources may gather data from one or more sensors (e.g., traffic monitoring locations along a road, or sensors provided with the GPS systems in vehicles). The source 140 may also include user-generated data. An appropriate filter may be applied, e.g., to discard "bad" data (e.g., intentional misinformation provided by users). There is no limit to the type or amount of data. The data may be unprocessed or "raw," or the data may undergo at least some level of processing prior to delivery to the host 130.

The host 130 may execute analytics for the data to generate results based on the data. For example, if the host 130 receives traffic data including number of cars on the road, the host 130 may process the traffic data to generate a traffic report. In an example, the analytics are executed continuously (or substantially continuously) by the host 130 to generate results in real-time (or substantially in real-time).

The host 130 may maintain the results of the analytics in at least one data structure (e.g., a table) in computer-readable media 135. The data structure may be accessed by the clients 110, e.g., executing a mobile application which retrieves the results of the analytics from the host 130 and outputs the results for the user at the client 110 (e.g., on the one mobile phone 110a).

It is noted that the host 130 is not limited in function. The host 130 may also provide other services to other computing or data processing systems or devices. For example, host 130 may also provide transaction processing services, email services, etc.

The host 130 may execute database program code 150. In an embodiment, the database program code 150 may include an analytics engine 152 and a query engine 154. In an example, the analytics engine 152 may be an SQL-based stream analytics engine, and the query engine 154 may be an SQL query engine. The analytics engine 152 may be integrated into the query engine 154.

The query engine 154 defines a unified query model over both static relations and dynamic streaming data. Techniques are implemented which extend the query engine 154 to support a unified model. A "cut-and-rewind" query execution mechanism may be implemented to enable an SQL query to be executed on a cycle-by-cycle basis for processing a data stream on a chunk-by-chunk basis, but without shutting the query instance down between chunks. Such an approach enables maintaining the application context across continuous execution cycles, e.g., for sliding-window oriented operations. The cycle-based transaction model, characterized by cycle-based isolation and visibility, may be used to deliver results of the analytics to the client 110, while the query for generating these results is continuously (or substantially continuously) running.

The analytics engine 152 executes the analytics on data. In an embodiment, the results are derived by a continuously running query, rather than multiple on-and-off queries. The results are derived from many (e.g., "infinite") events and therefore are themselves "infinite." Therefore, the continuous query runs cycle by cycle for processing the data stream on a chunk-by-chunk basis, and the query commits cycle-by-cycle to make chunk-wise results visible to users.

Because the results are "infinite," the results may be staged to avoid the data structure (in computer-readable media 135) that is holding these results, from becoming too large. For example, size of the data structure is of particular concern for mobile devices, such as those running WebOS and HTML 5. Staging may also enable scaling-up the analytics service to handle even more data.

In order to support fast access to the results, a "table-ring" mechanism may be implemented by the query engine 154. This allows the results of substantially infinite, real-time analytics to be maintained in a list of small-sized data structures (e.g., tables). The data structures may be labeled based on time sequence, and staged through "switching labels," without having to copy and/or move data, and without shutting down or incurring performance penalties for the continued query instance which is continuously generating those results.

Figure 2:
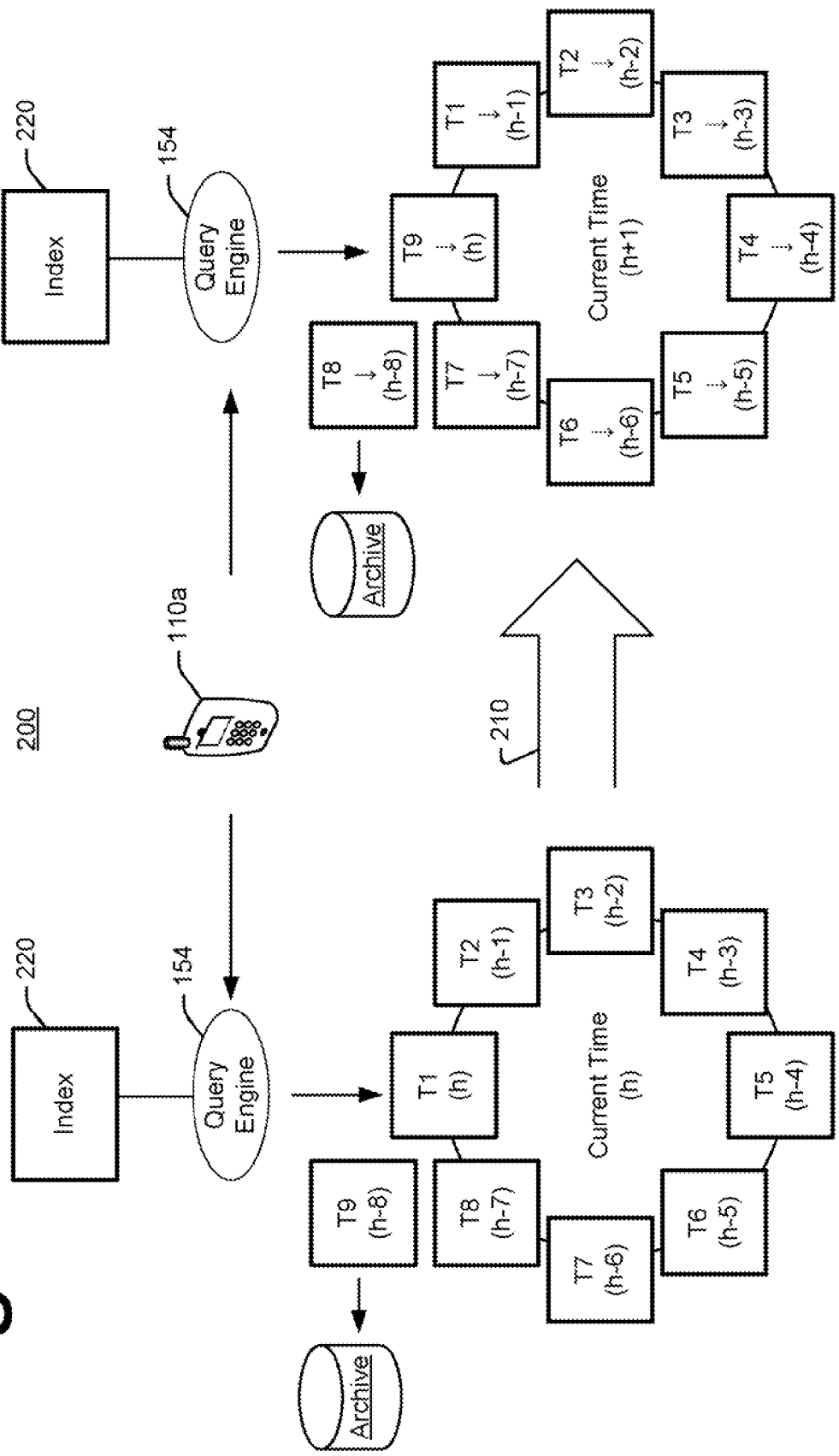
FIG. 2 illustrates an example of data staging results of analytics.

FIG. 2 illustrates an example 200 of data staging the results from analytics. The results may be accessed by many clients 110 (e.g., mobile phone 110a shown in FIG. 2) through the cloud service 105 (shown in FIG. 1) in real-time. In order to support efficient data staging for a real-time analytics service, such as cloud service 105 described above, the systems and methods described herein implement staging through metadata manipulation, without having to move and/or copy data, and without having to archive the data structure being queried.

In an embodiment, the results may be formatted as time series data. The time series data may be stored in any suitable data structures, such as read-sharable tables T. The read-sharable tables T are incrementally visible to the clients 110 as the results are staged in a step-by-step manner along with their generation.

Analytics may be applied on a continuous basis, such as in per-minute cycles (or some other time reference). Accordingly, time series data may be used for expressing the results of the analytics in a continuous manner. For purposes of illustration, the traffic status for a particular road may be updated every minute, for every road, for every direction, and so forth.

The results from the analytics may be maintained in a data structure for every hour (generated in 60 per-minute cycles), such as a table T shown in FIG. 2. The data is maintained for 8 hours "on-line" by the cloud service 105, and can be accessed by the clients 110 without having to access the archive.

In the example shown in FIG. 2, nine tables (T1-T9) are maintained, e.g., on a fast disk (or flash, memory buffer-pool, etc.). The nine tables (T1-T9) are implemented such that at a current time (e.g., the current hour (h) in this example), table T1 stores the current results of the analytics and is thus the target data structure. Table T2 stores the results of the prior hour (h−1), and so forth. Table T9 stores the oldest results in this example, and is thus archived asynchronously during the current hour (h).

The metatag (or "label") of each table T may represent a time boundary (e.g., the hour in this example). For example, the metatag or label for table T1 is (h), the label for table T2 is (h−1), and so forth. For data staging, the label is changed so that the target label (h) always points to the data structure having the current results, without moving and/or copying the content of the table to another table or file. This approach avoids read and/or write overhead and archiving overhead.

When the hour changes (as illustrated by arrow 210 in FIG. 2) so that the current hour is now (h+1), the table T9 has already finished being archived. Table T9 can be "moved up" and used to store the current results at this new time (h+1). Table T1 is now assigned the label corresponding to the last hour (h−1), and so forth, in a round-robin or "table-ring" approach.

It is noted, however, that while the label changes (e.g., table T9 now has the target label (h), and table T1 is now labeled (h−1)), the tables themselves have not been changed. That is, table T9 is still table T9 (although the contents have been archived), and table T1 is still table T1 and includes all of the contents that table T1 has always had.

In an embodiment, the metatags or labels (in this example, the timestamps (h), (h−1) . . . (h−8)) may be associated with the corresponding table. For example, an index 220 (e.g., a data dictionary), or other suitable data structure may be used for this association. Accordingly, if the client 110 is seeking current data, the query engine 154 can access the appropriate table (i.e., the target table). At the current time (h), the appropriate table or target table is table T1. But when the current time changes to (h+1), the appropriate table or target table is table T9, and so forth.

It is noted that the data staging as just described is not limited to the example shown in FIG. 2. Any suitable number of tables, type of data structures, time increments, and/or archiving schedule may be implemented.

In any event, the data staging provides a stable interface for both the client-side and server-side queries. To illustrate, the table holding a traffic status in the current hour may be named "current_road_condition." This name, in either the client-side query for retrieving the results, or the server-side query for receiving the results, remains the same at all times. That is, table T1 is always table T1, and table T9 is always table T9 (and so forth for all of the other tables). But the tables are renamed or otherwise associated with the table having the latest results (e.g., the table labeled (h)), or in this example, the table labeled "current_road_condition," be that table T1, T2, . . . or T9.

Such meta-data manipulation has been described herein as "changing labels." For example, the cloud service 105 may make available to the clients 110 a table named "current_road_condition." But the cloud service 105 actually stores the current results in the tables internally identified by T1, T2, . . . T9, for the traffic status of the current hour (h) and (h−1), . . . (h−7), (h8). When a client 110 connects to the cloud service 105 and requests the current-hour traffic status (e.g., using an SQL API for access to the table named "current_road_condition"), the cloud service 105 internally converts the table name from "current_road_condition" to "Table T9," if the analytics results of the current hour are stored in T9.

However, other embodiments are also contemplated and are not limited to "changing labels." In another example, a system utility may change other metadata for the table having the current results. Also for example, the name of the table itself may be changed, or the name of the table may be re-associated with different tables, e.g., using the index 220.

The server-side may also be enabled to support continuous stream analytics by switching the name of the query destination while the query is still running. For purposes of illustration, a cycle-based continuous query that runs in the per-minute (60 seconds) cycle, and persists the result in table T1 during hour 1, table T2 during hour 2, and so forth, in the round-robin manner described above.

In an embodiment, the query may be specified as: INSERT INTO T SELECT. However, the "into-relation" in this expression is substituted by the actual relations T1, T2 (and so forth), from one hour to the next hour. FIG. 3 illustrates example operations 300, including steps 310-390, which may be used by the query engine 154 for continuous staging (e.g., by switching "into-relations"). Informing the query engine 154 of the time boundary for switching the "into-relation" name, can be accomplished, for example, by extending the SQL, by extending the query, or using SSF registration.

For purposes of illustration, the SSF registration is utilized in the example of FIG. 3. In this example, the hourly boundary for table switch is turned to 60 per-minute cycles, which is made recognizable by the query engine at run-time.

The index (e.g., data dictionary or specific system table) maintains the metadata, such as name, ID, etc, of the set of actual "into-relations" as well as the order of them in the round-robin usage. A cycle based INSERT-INTO-SELECT query commits each cycle, through the following example call sequence:

close_into_relation( )
complete_transaction( )
start_transaction( )
reopen_into_relation( )

Between the complete_transaction( ) call and the reopen_into_relation( ) call, the number of execution cycles is checked, and if the number reaches 60 (in the above example), the switching of into-relations is executed.

For switching into-relations, the data dictionary or system table is used for look up, and the "next" relation ID is obtained (before the first cycle, the initial relation ID is obtained), and is passed to the reopen_into_relation( ). Thereafter, another into-relation serves as the query destination.

Staging real-time analytics results using this approach is particularly desirable for supporting mobile applications, due to the latency in connecting a mobile device to a cloud server. That is, it is often more efficient to download a batch of information from the server for analytics purposes. HTML 5 enabled WebOS programs provide such data buffering capability (e.g., as the localStorage( ) function). Using the server-side data staging approach, the tables with the latest results remain relatively small, and thus downloading these tables is efficient and readily managed.

In the example shown in FIG. 3, a query plan is created at 310, and then an into-relation is opened at 320. At 330, the query plan is executed. The query plan is rewound at 340. The into-relation is closed at 350 and 360. At 370, the cycle number is checked, and an index lookup is consulted at 375. The transaction starts at 380, and the into-relation is re-opened at 390.

Before continuing, it should be noted that the embodiments described above are provided for purposes of illustration, and are not intended to be limiting. Other devices and/or device configurations may be utilized to carry out the operations described herein.

FIG. 4 is a flowchart illustrating example operations 400 which may be implemented for data staging for analytics. Operations 400 may be embodied as machine readable instructions on one or more computer-readable medium. When executed on a processor, the instructions cause a general purpose computing device to be programmed as a special-purpose machine that implements the described operations. In an exemplary implementation, the components and connections depicted in the figures may be used.

In operation 410, current results from the analytics are maintained in a first data structure. The first data structure has a label identifying first data structure as a target for queries.

The label may represent a time boundary. In an example, the current results for the hour (h) may be maintained in a table T1 with a label (h). In operation 420, prior results from the analytics are maintained in at least one other data structure. For example, the results for the prior hour (h−1) may be maintained in a table T2 with a label (h−1), the results for 2 hours ago (h−2) may be maintained in a table T3 with a label (h−2), and so forth.

In operation 430, the label of the first data structure may be changed after a predetermined time. For example, at the next hour (h+1), the first data structure T1 may be labeled (h−1). Each of the other tables may be updated as well (e.g., T2 may be labeled (h−2)). In operation 440, the label may be assigned to one of the other data structures. The label now identifies one of the other data structures (e.g., the oldest table T9) as the target for queries. For example, the oldest table T9 may be relabeled as (h).

The operations shown and described herein are provided to illustrate various embodiments for data staging for analytics (analytics). It is noted that the operations are not limited to the ordering shown. Still other operations may also be implemented.

For purposes of illustration, further operations may include archiving results for at least one of the tables (e.g., the oldest table T9) before changing the label of the data structure (e.g., from (h−8) to (h)). Archiving the other data structures may be according to a round-robin approach. Further operations may also include changing the other labels for each of the other data structures by incrementing based on time.

Further operations may also include maintaining an index with each data structure and corresponding labels for the first data structure.

Further operations may also include providing a stable interface for clients regardless of which of the data structures is the target for queries.

Further operations may also include changing labels while a query is running. For example, changing labels while a query is running may be implemented by switching into-relations.

It is noted that the exemplary embodiments shown and described are provided for purposes of illustration and are not intended to be limiting. Still other embodiments are also contemplated.

The invention claimed is:

1. A method of data staging for results of analytics, the method stored as machine readable instructions on a computer-readable media executable by a processor, the method comprising:
   maintaining current results from the analytics in a first data structure, the first data structure labeled with a first label identifying the first data structure as a target for queries;
   maintaining prior results from the analytics in at least one other data structure;
   changing the first label of the first data structure to a second label after a predetermined time by incrementing based on time, wherein the labels represent a time boundary;
   assigning the first label to one of the other data structures, wherein the first label then identifies the one of the other data structures as the target for queries;
   archiving the other data structures according to a round-robin approach; and
   switching into-relations for the target queries while queries are running.

2. The method of claim 1, wherein the analytics is continuous stream analytics (CSA).

3. The method of claim 1, further comprising archiving results in the one of the other data structures before assigning the label.

4. The method of claim 1, further comprising providing a stable interface for clients regardless of which of the data structures is the target for queries.

5. The method of claim 4, further comprising maintaining an index with each data structure and corresponding labels for the first data structure.

6. A system with data staging for results of analytics, comprising:
   a first data structure for maintaining the results of the analytics, the first data structure labeled with a target metatag during a current time;
   a plurality of other data structures operatively associated with the first data structure;
   a host device operatively associated with the first data structure and the plurality of other data structures, the host device changing the target metatag from the first data structure to label one of the other data structures with the target metatag after a predetermined time by incrementing based on time, wherein the target metatags represent a time boundary, the host device switching into-relations for the target queries while queries are running and archiving the other data structures according to a round-robin approach.

7. The system of claim 6, wherein the client is a mobile device.

8. The system of claim 6, wherein the host device changes metatags for each of the other data structures after the predetermined time.

9. The system of claim 6, wherein an oldest data structure is archived before the predetermined time.

10. The system of claim 9, wherein the oldest data structure is assigned the target metatag after archiving.

11. The system of claim 6, wherein the metatags for each of the data structures is changed by incrementing based on time.

12. A system comprising:
   a cloud service with data staging, the cloud service providing results of analytics to at least one client;
   a first data structure labeled with a first target label, the first data structure operatively associated with the cloud service for maintaining current results from the analytics for a predetermined time;
   a host device operatively associated with the first data structure and a plurality of other data structures, the host device changing the target label of the first data structure to another label and labeling one of the other data structures with the target label after the predetermined time by incrementing based on time, wherein the target label represents a time boundary, the host device switching into-relations for the target queries while queries are running and archiving the other data structures according to a round-robin approach.

13. The system of claim 12, wherein the target label provides a stable interface for clients accessing the current results from a plurality of data structures at different times.

* * * * *